Patented July 14, 1925.

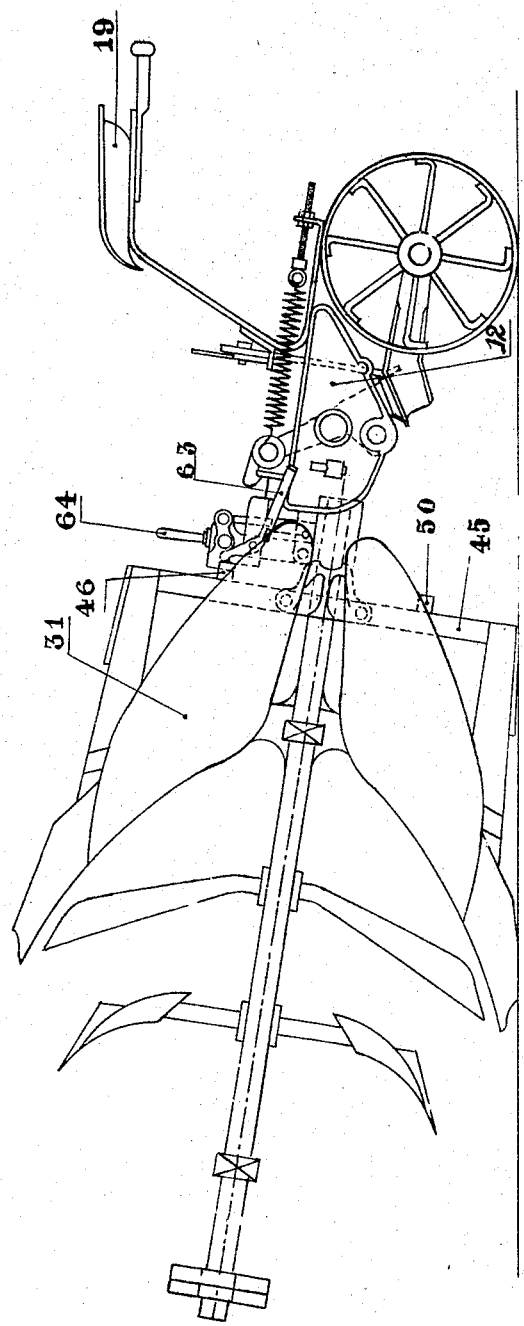

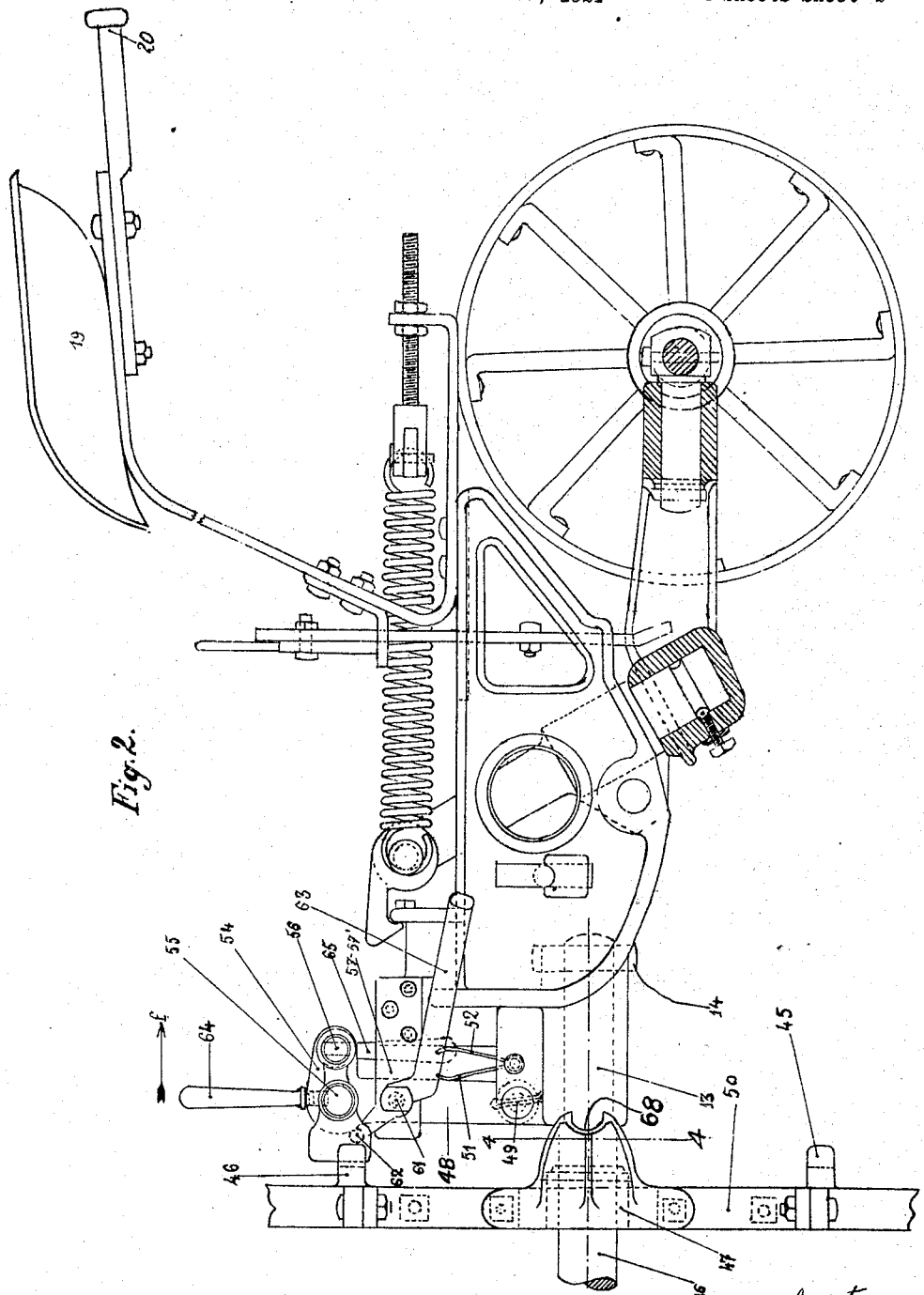

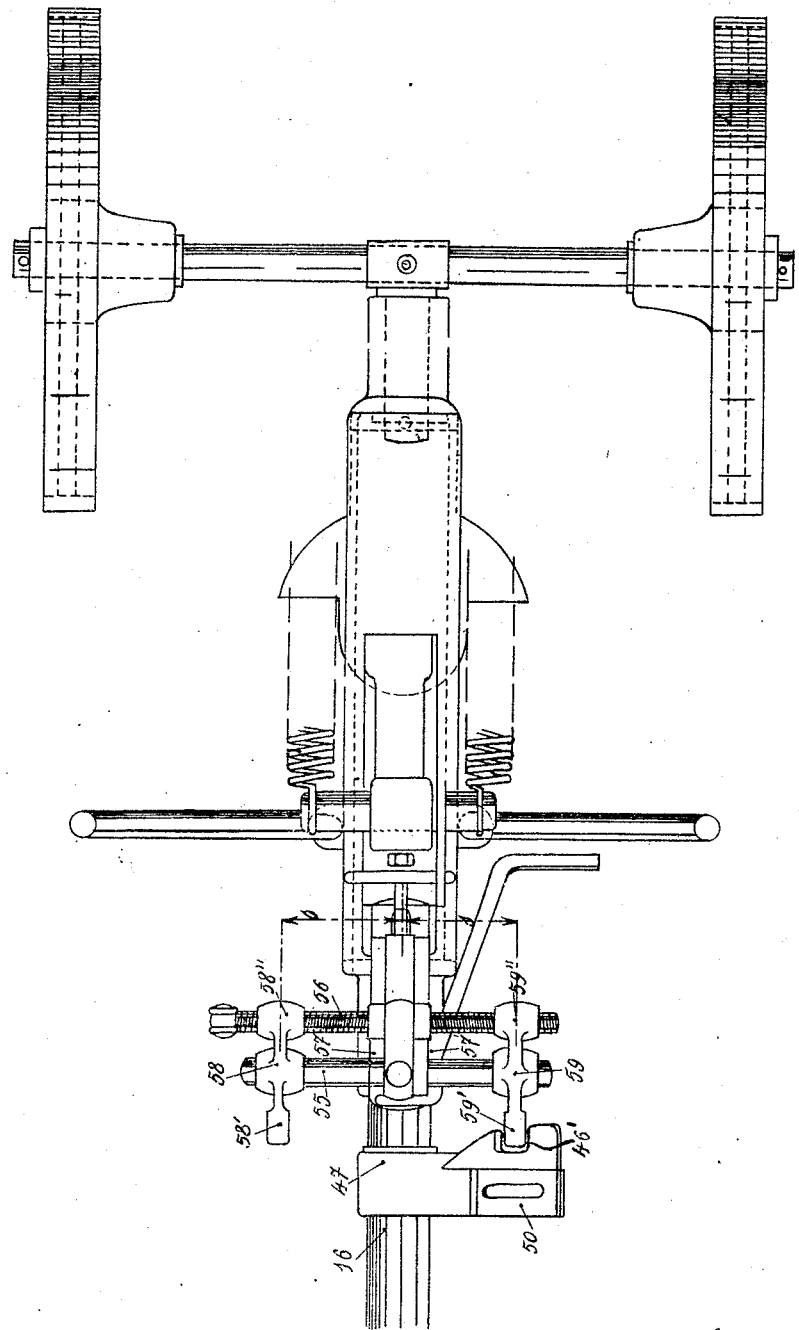

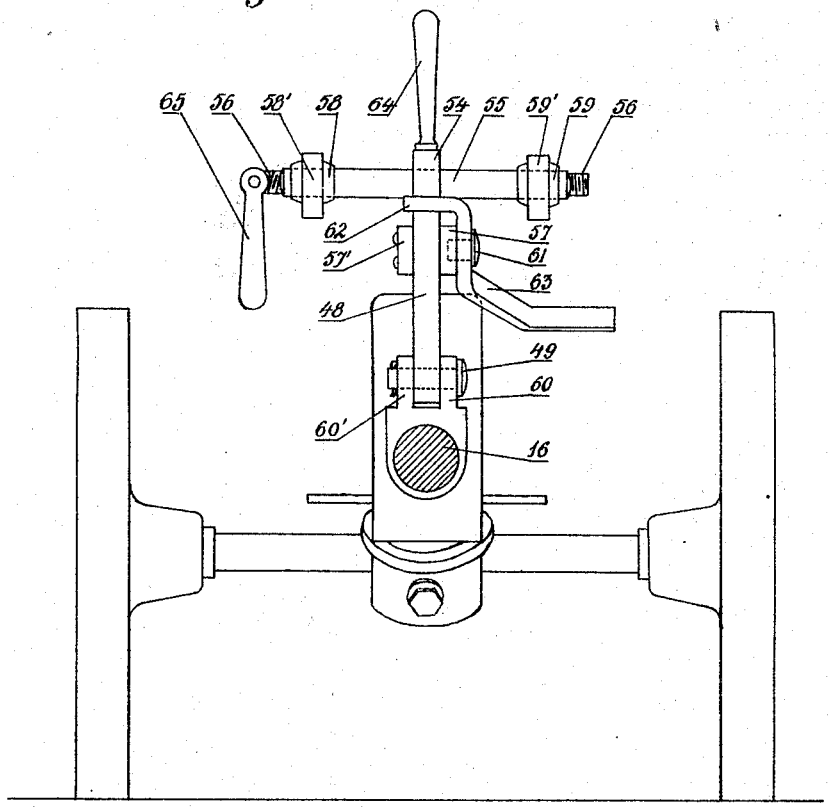

1,545,793

UNITED STATES PATENT OFFICE.

JULES PUECH, OF PARIS, FRANCE.

PLOWING MACHINE.

Application filed December 15, 1921. Serial No. 522,594.

*To all whom it may concern:*

Be it known that I, JULES PUECH, residing in Paris, France, have invented new and useful Improvements in or Relating to Plowing Machines, of which the following is a specification.

This invention relates to improvements in tractor plows and particularly to improvements in the plow described in my application for Letters Patent of the United States, filed on the 29th of December 1920. Ser. No. 433,882.

In the patent application hereinbefore referred to, a seat is provided at the back of a plow and mounted on a spring device so that the plow may be raised when the driver descends from his seat.

According to the present invention the rear seat and its mechanism is connected to the tractor by means of a fixed beam, the alternating plow turning about the said fixed beam and being held in working position by one of the two vertical tappets or catches engaging with the corresponding seats in lugs secured to the rear cross bar of the plow.

When travelling on the road with the plow in horizontal position, a third recess or notch engages with one of the vertical catches.

These catches are mounted on a swinging device, which may be disengaged by operating a handle or a pedal; moreover they may be moved transversely so that the plow may be regulated in working position.

This transverse movement is brought about by acting on a screw with a right and left hand thread, controlled by hand from the seat by the driver, which enables the catches to be brought closer together or farther away from each other.

The regulation of the two positions of the plow is therefore effected simultaneously, the correction of one of the positions relatively to the other, being obtained by moving the corresponding lug.

A plow according to the invention is illustrated by way of example in the accompanying drawings in which:

Fig. 1 is a longitudinal elevation of the rear part of the plow and shares.

Figures 2 and 3 are respectively an elevation and a plan on an enlarged scale of the rear part of the plow.

Fig. 4 is a vertical section taken on the line 4—4 of Fig. 2.

The rear cross-bar 50 of the plow turns on the fixed beam 16 by means of a sleeve or socket 47. Moreover the said bar carries two adjustable lugs 45 and 46 arranged symmetrically relatively to the socket 47.

The whole of the cross-bar and shares is adapted to turn about the socket 47 and suitably arranged bearing bushes at the front end, shown in Fig. 1.

A box 12 is keyed to the end 13 of the beam 16 by means of the key 14. Two blades 60 and 60' suitably secured to the box 12, carry a pin 49 about which turns the lower end of the lever 48 with a head 54 at the top.

Two blades 57 and 57' parallel to the above blades and secured to the box 12, constitute a guide in which the movable lever 48 is adapted to move.

On the head 54 of the lever 48 is transversely arranged a pin 55 rigidly secured, constituting a guide, and the screw-threaded rod 56. The rod 56 has reversely arranged threads for the parts which are on the left and on the right of the supporting surface. On the said pin 55 are slidably mounted adjustable catches 58 and 59 and sleeves 58'' and 59'' which form nuts engaging the reversely threaded ends of the rod 56 which rod may be rotated by turning the handle 65 provided at one of the ends thereof.

The lever 48 is moved in the direction *f* by means of the handle 64, or by means of a device operated by the foot of the driver seated on the seat 19. This device comprises a lever pivoted about a pin 61, with two unequal arms 62 and 63. The lever 63 is depressed with the foot, whereupon the end of the lever 62 presses against the part 54 of the lever 48, this producing the rotation of the latter in the direction *f*. Spring blades 52 and 51 oppose the said movement and tend to bring the lever 48 into the position shown in Fig. 2.

According to Fig. 3, the projection 59' of the catch 59 engages with the notch 46' of the cross-bar 50. It will be understood that in that way the shares 31 which are secured to the bar 50 are locked in the position they are occupying, owing to the engagement of the fixed finger or projection of the catch 59' with the notch 46'.

If it is desired to modify the angle at which the shares turn the ground, it is sufficient to rotate the rod 56 by means of the handle 65. By turning this rod, the nuts 58″ and 59″ are brought closer to, or farther away from, the central plate 54 so as to vary the distances *s* respectively separating them.

By moving the nut 59″ which is in engagement, nearer or further away, the cross bar 50 is turned about the beam 16, with the result that the position of the shares relatively to the vertical will be modified.

To unlock the shares 31, it is sufficient to disengage the projection 59′ from the notch 46″. To that end, either the lever 48 is pulled in the direction *f* by means of the handle 64, or the lever arm 63 depressed with the foot, driver remaining seated on his seat.

When the cross-bar, is unlocked, the shares turn freely about the beam, which is a great advantage as it facilitates the turning of the plow at the end of the furrows.

For road transport, the shares being in horizontal position, the notch 68 of the sockets 47 engages with the lever 48.

A practical construction of such a device has given excellent results owing to the possibility of regulating the plow during travelling, of working it whilst remaining seated at the back, and of bringing about the turning of the plow by operating the pedal with the foot.

Having thus described my invention, I claim:

1. In a tractor plow, a fixed beam, reversely arranged shaft pivotally mounted thereon, a cross bar connecting the shaft and provided with symmetrically arranged notches, a lever pivotally mounted on a fixed beam, means carried by the lever to engage either of the notches and means to shift the notch-engaging means laterally to thereby correspondingly adjust the shaft as may be required.

2. In a tractor plow, a beam, reversely arranged shaft pivotally mounted on the beam, a lever also pivotally mounted on the beam, share locking and adjusting means laterally shiftably mounted on the lever and means, including a right and left hand screw mounted on said lever, to operate said locking and shifting means.

In witness whereof I affix my signature.

JULES PUECH.